Feb. 27, 1934.  A. J. BROWNING  1,948,783
PROTECTOR FOR TURPENTINE COLLECTING RECEPTACLES
Filed April 11, 1933
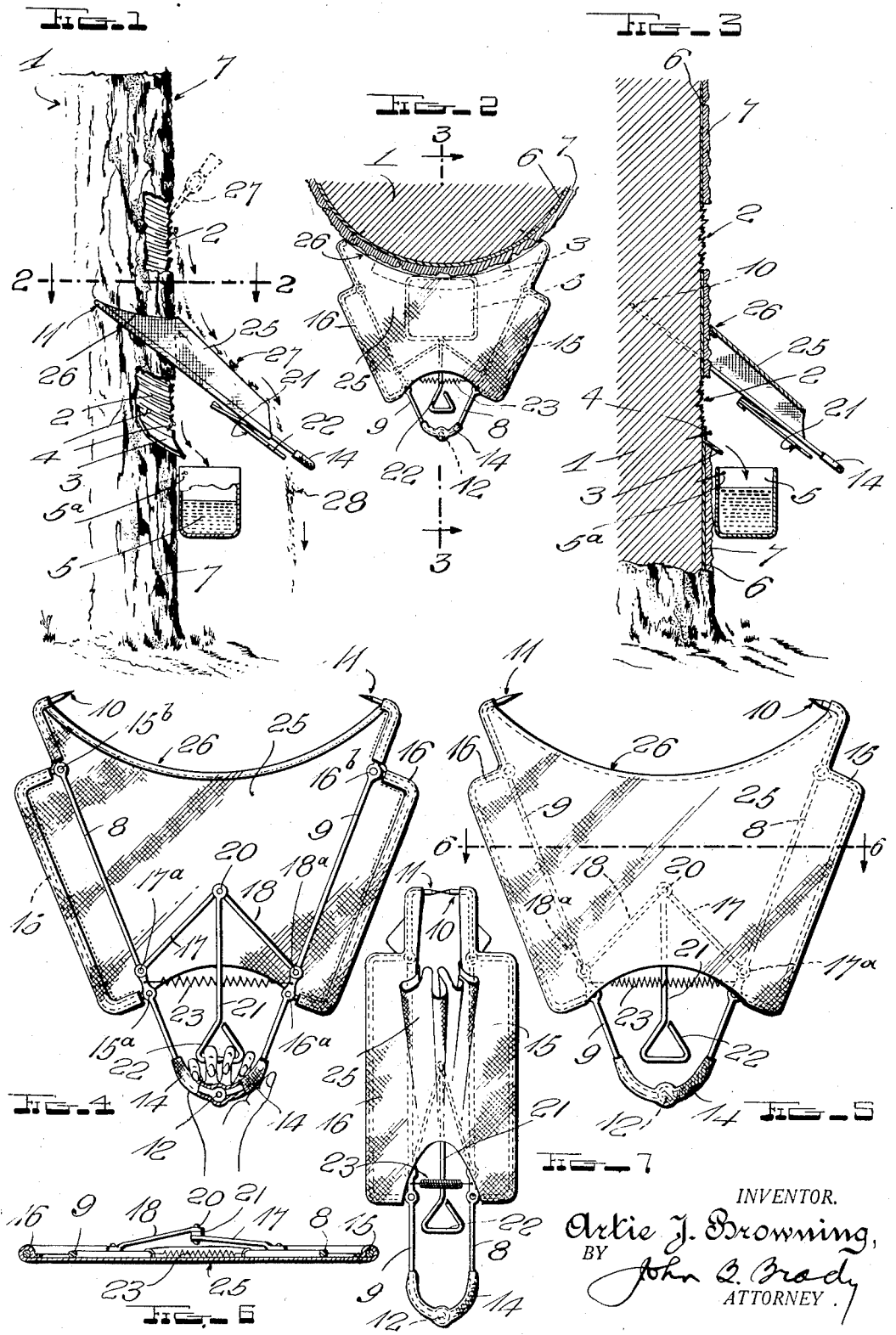
INVENTOR.
Artie J. Browning,
BY John Q. Brady
ATTORNEY.

Patented Feb. 27, 1934

1,948,783

UNITED STATES PATENT OFFICE 1,948,783

PROTECTOR FOR TURPENTINE COLLECTING RECEPTACLES

Artie J. Browning, Brunswick, Ga., assignor of one-fourth to Frank M. Scarlett and one-fourth to Thomas B. Gamble, Brunswick, Ga.

Application April 11, 1933. Serial No. 665,609

12 Claims. (Cl. 47—11)

My invention relates broadly to the art of turpentine, rosin and tree sap collection, and more particularly to an instrument which is attachable to a tree for protecting the turpentine or sap collecting receptacle against the accumulation of chips and bark which might otherwise fall therein when the tree is being scored for facilitating the flow of sap.

One of the objects of my invention is to provide a construction of protector which may be readily applied to a tree above the sap collecting receptacle for preventing chips and bark, which fall when a fresh scoring is made on the tree, from entering the sap collecting receptacle.

Another object of my invention is to provide a portable instrument which may be carried by a worker from tree to tree and readily placed in position directly beneath that part of the tree which is to be scored for directing chips and bark away from the tree and beyond the sap collecting receptacle adjacent the tree for preventing undesired accumulation of chips and bark in the sap collecting receptacle.

Another object of my invention is to provide a portable instrumentality serving as a protector for sap collecting receptacles which includes a flexible sheet of material which may be readily conformed to the shapes of various trees and snugly fitted against the tree and stretched taut for acting as a guide for directing chips and bark away from the tree and the sap collecting receptacle adjacent thereto when a fresh scoring is made in the tree.

Still another object of my invention is to provide a construction of adjustable instrumentality which is readily attachable to trees of various sizes by a thrust action of one hand of the operator, thus leaving the other hand of the operator free.

A further object of my invention is to provide an adjustable spring controlled gripper and flexible apron device which is readily attachable to the trunk of a tree for preventing the direct falling of chips and bark into a sap collecting receptacle immediately adjacent the trunk of the tree.

Other and further objects of my invention reside in the construction of protector for turpentine collecting receptacles as set forth more fully in the specification hereinafter following by reference to the accompanying drawing, in which:

Figure 1 is a side elevation of a portion of the trunk of a pine tree showing the application of my improved protector, to exclude chips and other foreign matter from a turpentine receptacle, while a new scoring of the sap bearing cambium layer is taking place; Fig. 2 is a horizontal sectional view taken substantially on line 2—2 of Fig. 1; Fig. 3 is a central vertical longitudinal sectional view on line 3—3 of Fig. 2, showing a portion of the trunk of a pine tree disclosing my improved protector placed substantially immediately above an appropriate sap receiving receptacle in order to exclude extraneous matter from the same; Fig. 4 is a bottom plan view on an enlarged scale of a protector constructed in accordance with my invention showing the manner of opening the same; Fig. 5 is a front elevation thereof; Fig. 6 is a horizontal sectional view taken substantially on line 6—6 of Fig. 5; and Fig. 7 is a front elevation of the protector, showing the same in normal folded position ready to be carried from tree to tree and applied.

In the collection of turpentine it is necessary to hack or score the cambium of the trunk of pine trees. It is this cambium layer of the pine tree which conveys the sap from the roots to the branches and needles of the tree. It is necessary to chip away a portion of the outer bark, the cambium layer, and some of the wood to cause an open wound to provide an outflow for the sap. This work is usually preferably carried on in the springtime when the trees begin their yearly growth and the sap is running strongly. A new scoring of the trees is usually made at week's intervals or as soon as the flow from the serrations made in the tree stops. The cause is that nature, in her endeavor to heal the wounds of the tree, causes a clogging up of these wounds and hence there is a cessation of the flow of sap, or in other words, the sap oxidizes forming a hard crust. To again start a free flow of sap, it is necessary to hack another surface of the tree, preferably a bit higher up on the trunk of the tree. A gutter tin or flow guide is secured to the tree immediately below the scored or hacked portion and serves to direct the sap into a suitable receptacle which is fastened to the tree. The turpentine accumulates in the scored or hacked portions of the tree and drips down under guidance of the gutter member into the receptacle. After the turpentine has flowed from the tree into the receptacle and the turpentine has oxidized over the surface of the hacked or scored portion of the tree there is no further flow into the receptacle. It is then necessary to cut a fresh gash in the tree and for this purpose the worker cuts a fresh gash in the tree. Heretofore the turpentine receptacle has accumulated dirt, chips and particles of bark from this hacking operation.

My invention provides for protection of the turpentine collecting receptacle from this undesired collection of foreign particles. The instrumentality of my invention is thrust into position on the tree by the operator in a position immediately below that part of the tree which is to be freshly hacked and above the turpentine receptacle which is supported on the tree. The instrumentality of my invention includes a pair of pivotally connected members having tree gripping spikes at the extremities thereof and having frame members secured to the sides thereof across which a flexible wire screening, canvas or other strong fabric material is secured. The pivotally connected frame members have a pair of links pivotally connected therewith and pivotally connected to a central actuator which has a hand grip thereon terminating in a position immediately adjacent a hand grip located at the juncture of the aforesaid frame member. A spring device is disposed between the frame members and tends to normally maintain said frame members in a substantially parallel position with the flexible apron carried thereby in folded position. However the operator may grasp the hand grips on said actuator and on the pivotally connected ends of said frame members and draw said hand grips together in such manner that the frame members are spread against the action of the spring device, thereby stretching the flexible covering taut. The operator thrusts the tree gripping spikes of the frame members into the trunk of the tree, the flexible sheeting or apron conforming in shape to the tree and providing a distributing chute for guiding the chips and bark and other foreign matter which fall from the further hacking of the tree and preventing the accumulation of such foreign matter into the turpentine receptacle. When the protector is in place the operator proceeds to hack through the cambium layer of the trunk with assurance that the flying chips and bark will not be deposited in the turpentine collecting receptacle.

Referring to the drawing in more detail, reference character 1 designates a representative tree showing the instrumentalities of my invention attached thereto. The tree is shown provided with a hacked or scored surface 2 which is cut through the layer of bark 7 and cambium layer 6. A gutter or guide member is schematically shown at 3 fastened to the trunk of the tree below the scored or hacked portion by any suitable means as represented at 4. The turpentine collecting receptacle is represented schematically at 5 attached in any suitable manner as represented generally at 5a to the tree. It will be understood that many varieties of different forms of turpentine collecting receptacles may be employed and different forms of flow guides may be employed. I have illustrated these elements in schematic form and do not intend by such limitations that my invention shall be in any way limited to the particular forms shown.

The instrumentality of my invention is shown more clearly in Figs. 4 and 5 as comprising a pair of frame members or arms 8 and 9 terminating in tree gripping spikes 10 and 11 directed on lines normal to the axes of the frame members and on lines which intersect each other when the frame members are spread to their limiting positions at an obtuse angle. The opposite ends of the frame members 8 and 9 are pivotally connected as shown at 12. A flexible hand grip 14 is provided over the pivotal connection 12 of the frame members 8 and 9, as shown. Each of the frame members 8 and 9 is provided with an auxiliary frame constituted by members 15 and 16. Members 15 and 16 are in the form of wirelike frames which extend laterally from the frame members 8 and 9 which are rapidly connected therewith through rivet connections 15a, 15b and 16a and 16b, respectively. The frame members 8 and 9 with the auxiliary frame members 15 and 16 carried thereby are adapted to swing in the fashion of a pair of shear blades. That is to say, frame members 8 and 9 are movable from a collapsed position as illustrated in Fig. 7 to a position of maximum spread illustrated in Figs. 4 and 5. In order to control the spreading and collapsing of the frame members 8 and 9, I provide a pair of link members 17 and 18 which are pivotally connected at 17a and 18a to frame members 8 and 9 at points just within the connections of auxiliary frame members 15 and 16 with respect to frame members 8 and 9. The links 17 and 18 are pivotally connected as shown at 20. Extending from the pivotal connection 20, I provide a central actuator 21 which terminates in a hand grip 22 in a position immediately adjacent the hand grip 14 on frame members 8 and 9. A coil spring 23 interconnects frame members 8 and 9 at points between the connections 15a and 17a on frame member 8 and the connections 16a and 18a on frame member 9. The coil spring 23 tends to maintain the frame members 8 and 9 in substantially parallel position as illustrated in Fig. 7. The flexible sheeting of wire screen or flexible fabric is shown at 25 sewed at the edges thereof over auxiliary frame members 15 and 16 and over the extremities of frame members 8 and 9. The external edge of the flexible sheet of material 25 is reinforced at 26 and is formed on an arc adapted to conform substantially with the shape of the trunk of the tree when the instrument is placed in position.

It will be seen that the instrument is readily carried from tree to tree in the collapsed form shown in Fig. 7. This is very convenient if it is necessary for the operator to climb the tree and support himself with one hand while the protector is adjusted in position by the thrust of his free hand. It is only necessary for the operator to grasp hand grips 14 and 22 as shown in Fig. 4 and draw these two hand grips together, thereby spreading the arms of the frame members 8 and 9 to substantially embrace the tree. The operator then thrusts the spikes 10 and 11 into the tree in the positions illustrated in Figs. 1 and 2, stretching the covering 25 taut in a position closely conforming with the contour of the tree. It will be seen that the cover 25 is stretched into the position shown in Figs. 1 and 2 by the circular contour of the trunk of the tree. The cover 25 does not have to extend fully around the tree but may only subtend a small portion of the circumference of the tree as illustrated in Fig. 2. The device may be made in various sizes to accommodate groups of trees of varying diameter. However by reason of the flexibility of the cover 25 the device can be made to conform to trees of various diameters within a large range of sizes. Fig. 2 is therefore not to be regarded as limiting my invention by showing the device subtending a relatively small portion of the circumference of the tree as it will be understood that the protector of my invention may be shaped to conform to various sizes of trees. The cover provides a substantial protection against the falling of bark, chips, dirt and other matter into the sap collecting receptacle. As illustrated in Fig. 1, the bark and chips which are removed by the operation of hacking tool 27 are directed as represented generally at 28 beyond the limits of the sap collecting receptacle and therefore do not accumulate within the receptacle. After the fresh scoring or hacking has been completed the device of my invention may be readily removed by again spreading the frame members 8 and 9 by drawing the hand grips 22 and 14 together, thereby enabling the protector to be withdrawn and removed to another tree as the worker passes from tree to tree.

The instrumentality of my invention has been found to be extremely practical in its manufacture, production and use. The improvement in the quality of turpentine more than compensates for the small expense of the device and the small effort required in placing the device in position. I have illustrated my invention in one of its preferred embodiments, but I realize that modifications and improvements may be made and I intend no limitations upon my invention other than are imposed by the scope of the appended claims.

What I claim as new and desire to secure by Letters Patent of the United States is as follows:

1. A protector for sap collecting receptacles comprising a pair of pivotally connected arms, spikes at the extremities of said arms engageable in a tree, a flexible cover stretchable across said arms, and spring means tending to constantly urge said arms to a parallel position.

2. A protector for sap collecting receptacles comprising a pair of pivotally connected arms, a hand grip adjacent the pivotal connection of said arms, an auxiliary frame carried by each of said arms, a flexible sheet of material connected with the said auxiliary frames and with said arms, means for normally urging said arms to a parallel position, and means adjacent said hand grip for spreading said arms to a position where the ends of said arms are engaged with the trunk of a tree for stretching said flexible sheet of material taut across said auxiliary frames and said arms.

3. A protector for sap collecting receptacles comprising a pair of pivotally connected arms, a hand grip located at the pivotal connection of said arms, spikes on the extremities of said arms engageable with a tree, a flexible sheet of material extending between said arms, a pair of link members pivotally connected with said arms, a pivotal connection between said pair of link members, an actuator extending from said pivotally connected links, a hand grip on said actuator adjacent the hand grip on said arms whereby said arms may be spread for stretching said flexible sheet of material taut by squeezing said hand grips together.

4. A protector for sap collecting receptacles comprising a pair of pivotally connected arms, a hand grip disposed adjacent the pivotal connection of said arms, spikes on the extremities of said arms for engaging the trunk of a tree, an auxiliary frame member connected with each of said arms, a flexible sheet of material extending between said auxiliary frame members and between said arms, a pair of link members pivotally connected with said arms and pivotally connected to each other, an actuator extending from the pivotal connection of said link members, a hand grip on the extremity of said actuator disposed adjacent the hand grip on said arms, and spring means interconnecting said arms for normally maintaining said arms in parallel position and opposing the movement of said hand grips toward each other.

5. A protector for sap collecting receptacles comprising a pair of pivotally connected arms, a hand grip disposed adjacent the pivotal connection of said arms, spikes on the extremities of said arms for engaging the trunk of a tree, an auxiliary frame member connected with each of said arms, a flexible sheet of material extending between said auxiliary frame members and between said arms, a pair of link members pivotally connected together and having their remote ends pivotally connected with said arms within the limits of the connection of said auxiliary frame members with said arms, an actuator extending from the pivotal connection of said links, and a hand grip on said actuator adjacent the hand grip on said arms, and spring means interconnecting said arms in positions intermediate the connections of said links with said arms and the connections of said auxiliary frame members with said arms.

6. A protector for sap collecting receptacles comprising a pair of pivotally connected arms, spikes on the extremities of said arms for engaging the trunk of a tree, a flexible sheet of material connected between said arms, means for normally maintaining said arms in substantially parallel position with said flexible sheet of material loosely suspended therebetween, and means for spreading said arms in fan-like arrangement for stretching said flexible sheet of material taut adjacent the trunk of a tree.

7. A protector for sap collecting receptacles comprising a pair of pivotally connected arms, spikes on the extremities of said arms engageable with the trunk of a tree, a flexible sheet of material suspended between said arms, said sheet of material being formed on an arc of a circle adjacent the spikes on said arms, and means for adjusting said flexible sheet of material to conform to trees having trunks of various diameters.

8. A protector for sap collecting receptacles comprising a pair of pivotally connected arms, spikes on the extremities of said arms for engaging the trunk of a tree, a flexible sheet of material connected with said arms, and means for controlling the spread of said arms for conforming said flexible sheet of material with trunks of trees of various diameters.

9. A protector for sap collecting receptacles comprising a pair of pivotally connected arms, spikes on the extremities of said arms for engaging the trunk of a tree, a flexible sheet of material connected with said arms, and link mechanism extending between said arms for controlling the spread of said arms and conforming said flexible sheet of material about the trunk of trees of various diameters.

10. A protector for sap collecting receptacles comprising a pair of pivotally connected arms, spikes on the extremities of said arms for engaging the trunk of a tree, a flexible sheet of material connected with said arms, resilient means connected between said arms, and hand actuated means connected with said arms for opposing said resilient means, and controlling the spread of said arms for conforming said flexible sheet of material with the trunks of trees of various diameters.

11. A protector for sap collecting receptacles comprising a pair of pivotally connected arms, spikes on the extremities of said arms for engaging the trunk of a tree, a flexible sheet of material connected with said arms, a coil spring extending between said arms, pivotally connected link mechanism connected with said arms adjacent said coil spring, and a hand actuator connected with said pivotally connected link mechanism for opposing the effects of said coil spring and controlling the spread of said arms for conforming said flexible sheet of material to tree trunks of various diameters.

12. A protector for sap collecting receptacles comprising a pair of pivotally connected arms, spikes on the extremities of said arms for engaging the trunk of a tree, a flexible sheet of material connected with said arms, a pair of hand grip devices associated with said arms and operative by the grasp of the hand of an operator for controlling the spread of said arms for conforming said flexible sheet of material with tree trunks of various diameters.

ARTIE J. BROWNING.